US012312791B2

(12) United States Patent
Yang

(10) Patent No.: US 12,312,791 B2
(45) Date of Patent: May 27, 2025

(54) INTELLIGENT TOILET REMOTE CONTROLLER AND INTELLIGENT TOILET CONTROL SYSTEM

(71) Applicant: Shanghai Kohler Electronics, Ltd., Shanghai (CN)

(72) Inventor: Guanjun Yang, Shanghai (CN)

(73) Assignee: Shanghai KOHLER Electronics, Ltd., Shanghai (CN)

( * ) Notice: Subject to any disclaimer, the term of this patent is extended or adjusted under 35 U.S.C. 154(b) by 343 days.

(21) Appl. No.: 17/749,833

(22) Filed: May 20, 2022

(65) Prior Publication Data

US 2022/0403637 A1 Dec. 22, 2022

(30) Foreign Application Priority Data

Jun. 21, 2021 (CN) ......................... 202121384008.4

(51) Int. Cl.
*E03D 9/00* (2006.01)
*G08C 17/02* (2006.01)

(52) U.S. Cl.
CPC ............... *E03D 9/00* (2013.01); *G08C 17/02* (2013.01)

(58) Field of Classification Search
CPC ............ E03D 9/00; E03D 9/002; G08C 17/02
See application file for complete search history.

(56) References Cited

U.S. PATENT DOCUMENTS 10,924,603 B1 * 2/2021 Clements ............... G06Q 20/18
2004/0119602 A1 * 6/2004 Blum ........................ G09F 9/30 340/815.4
2005/0027208 A1 * 2/2005 Shiraishi ................... E03D 9/08 600/551
2009/0277662 A1 * 11/2009 Shiue ................... H05K 5/0017 174/50.51
2012/0200528 A1 8/2012 Ciesla et al.
2015/0000025 A1 1/2015 Clements
2015/0218784 A1 * 8/2015 Mazz ...................... E03C 1/055 4/597
2016/0035290 A1 2/2016 Kim et al.
2022/0122552 A1 * 4/2022 Lin ................... G02F 1/133603

FOREIGN PATENT DOCUMENTS

JP 2009041208 A 2/2009
JP 2018155033 A 10/2018

OTHER PUBLICATIONS

Extended European Search Report from European Patent Application No. 22178459.8, dated Nov. 8, 2022, 8 pages.
Indian Office Action for Indian Patent Application No. 202214035409 dispatched Apr. 7, 2025.

* cited by examiner

*Primary Examiner* — Brian Wilson
(74) *Attorney, Agent, or Firm* — Lempia Summerfield Katz LLC

(57) ABSTRACT

The present application discloses an intelligent toilet remote controller and an intelligent toilet control system. The intelligent toilet remote controller includes a remote controller body and a processor accommodated in the remote controller body and configured to be communicatively connected with an intelligent toilet, wherein the remote controller body includes a cleaning timing display, and the cleaning timing display is connected with the processor communicatively. According to the present application, the cleaning timing display is added on the intelligent toilet remote controller, which adds functions of time reminding and human-machine sensory interaction and plays a better role in customer care.

18 Claims, 3 Drawing Sheets

INTELLIGENT TOILET REMOTE CONTROLLER AND INTELLIGENT TOILET CONTROL SYSTEM

CROSS REFERENCE TO RELATED APPLICATION

This application claims the benefit of priority to Chinese Patent Application No. 202121384008.4 filed in the Chinese Intellectual Property Office on Jun. 21, 2021, which is hereby incorporated by reference in its entirety.

FIELD

The present disclosure relates to the technical field of sanitary devices, and more particularly, to an intelligent toilet remote controller and an intelligent toilet control system.

BACKGROUND

An existing intelligent toilet is generally provided with a remote controller, and a user controls the intelligent toilet to execute corresponding operations through the remote controller, such as controlling various cleaning functions of the intelligent toilet.

However, an intelligent toilet remote controller basically has a simple remote control function, and a cleaning duration of a spraying rod of the intelligent toilet cannot be displayed. As to some remote controllers with a screen, buttons are simply arranged in an on-screen menu. At present, in order to reflect an excellent heating function, manufacturers in the market usually set a very long cleaning duration. However, the lack of display of the cleaning duration in the prior art will cause the user to be unable to clearly know how much time is needed to finish cleaning, which affects user experience.

SUMMARY

Thus, it is necessary to provide an intelligent toilet remote controller and an intelligent toilet control system to solve the technical problem that a cleaning time is not displayed in the prior art.

The present disclosure provides an intelligent toilet remote controller, comprising: a remote controller body and a controller accommodated in the remote controller body and used for a communicative connection with an intelligent toilet, wherein the remote controller body is provided with a cleaning timing display, and the cleaning timing display is communicatively connected with the controller.

Further, the remote controller body comprises a housing and a button film attached on an outer surface of the housing, the cleaning timing display is a display hardware arranged on the side of the button film facing the housing, and the display hardware is communicatively connected with the controller.

Further, the part of the button film where the button film contacts the display hardware is a semitransparent film.

Further, the display hardware is a digital tube or a display screen.

Further, the display hardware is communicatively connected with the controller through a communication line, one end of the communication line is communicatively connected with the display hardware, and the other end of the communication line is inserted into the housing to be communicatively connected with the controller.

Further, the communication line is a flexible flat cable.

Further, the intelligent toilet remote controller further comprises an electric control board accommodated in the housing, wherein the controller is fixed on the electric control board.

Further, the electric control board is provided with a timer and a radio frequency module, and the controller is communicatively connected with the timer, the radio frequency module and the display hardware respectively.

Further, the housing is provided with one or more buttons, the buttons contact corresponding switches on the electric control board, and the switches are communicatively connected with input ends of the controller.

The present application provides an intelligent toilet control system, comprising an intelligent toilet and the intelligent toilet remote controller above, wherein a host of the intelligent toilet is communicatively connected with the controller of the intelligent toilet remote controller.

According to the present application, the cleaning timing display is added on the intelligent toilet remote controller, which increases functions of time reminding and human-machine sensory interaction and plays a better role in customer care. In another example, the buttons of the remote controller may command a flush to remove the contents of the bowl of the toilet and the timing display may relate to the flushing cycle.

Reference numerals

10 refers to an intelligent toilet remote controller; 1 refers to a housing; 11 refers to buttons; 2 refers to a display hardware; 21 refers to a communication line; 22 refers to a rear panel; 23 refers a key panel; 24 refers to a battery; 25 refers to a battery cap; 3 refers to a button film; 4 refers to an electric control board; 20 refers to an intelligent toilet; and 201 refers to a bidet.

DETAILED DESCRIPTION

The present application is further described in detail hereinafter with reference to the accompanying drawings and the specific embodiments.

Embodiment 1

Figure 1:
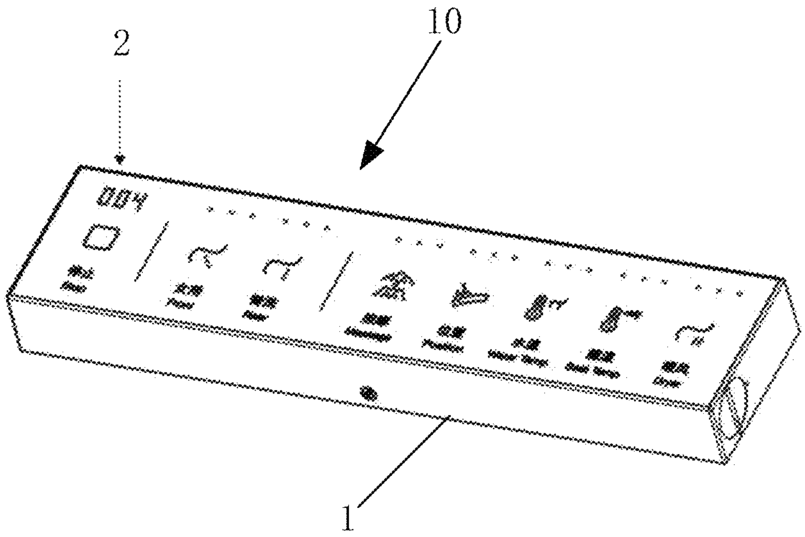
FIG. 1 is a schematic structural diagram of an intelligent toilet remote controller according to an embodiment of the present application.
Figure 2:
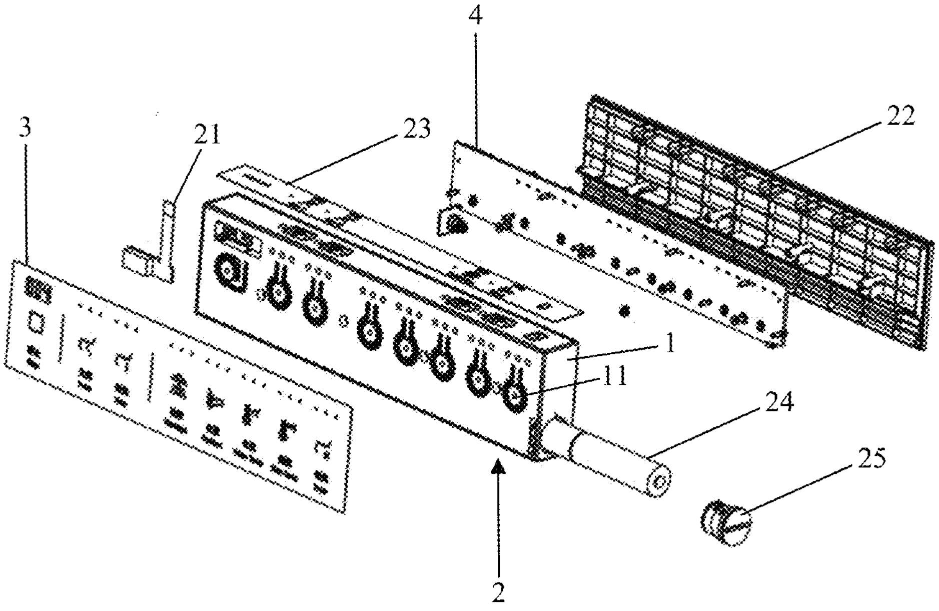
FIG. 2 is an exploded view of the intelligent toilet remote controller according to the embodiment of the present application.
Figure 3:
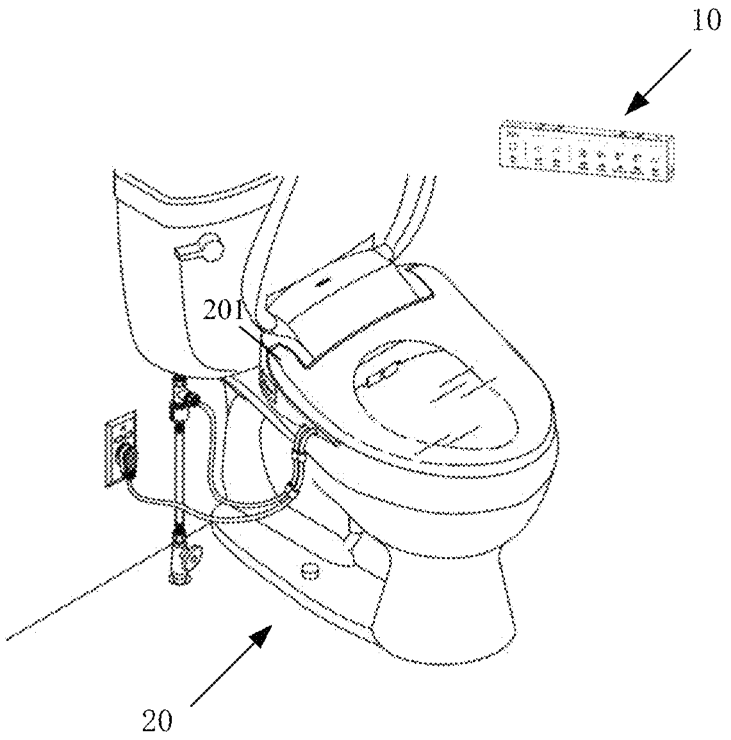
FIG. 3 is a schematic systematic diagram of an intelligent toilet control system according to an embodiment of the present application.

FIG. 1 is a schematic structural diagram of an intelligent toilet remote controller according to an embodiment of the present application. FIG. 2 is an exploded view of the intelligent toilet remote controller according to the embodiment of the present application. FIG. 3 is a schematic systematic diagram of an intelligent toilet control system according to an embodiment of the present application. As shown in FIG. 1 and FIG. 2, an intelligent toilet remote controller 10 according an embodiment of the present application comprises: a remote controller body and a controller accommodated in the remote controller body and used for a communicative connection with an intelligent toilet 20 as shown in FIG. 3. The remote controller body is provided with a cleaning timing display, and the cleaning timing display is communicatively connected with the controller of the intelligent toilet remote controller 10.

In an embodiment, the controller of the intelligent toilet remote controller 10 may comprise a processor configured to perform an operation, function, or the like as described in the present disclosure. The processor may be a general purpose or specific purpose processor, an application specific integrated circuit (ASIC), one or more programmable logic controllers (PLCs), one or more field programmable gate arrays (FPGAs), a group of processing components, or other suitable processing components. The processor is configured to execute computer code or instructions stored in memory or received from other computer readable media (e.g., embedded flash memory, local hard disk storage, local ROM, network storage, a remote server, etc.). The processor may be a single device or combinations of devices, such as associated with a network, distributed processing, or cloud computing.

In order to save water and show a cleaning process to a customer at the same time, so as to convey more human-computer interactions, the cleaning process is shown on the remote controller in a time mode in the present application.

Specifically, the cleaning timing display is added in the button-type remote controller in the present application, and the controller is in interaction and real-time communication with the intelligent toilet.

A user operates the intelligent toilet remote controller 10 to send a cleaning command, and after the intelligent toilet 20 receives the cleaning command, a spraying rod is stretched or extended out to spray water. When water is sprayed out, the intelligent toilet 20 sends a command back to the intelligent toilet remote controller 10, and the intelligent toilet remote controller 10 starts to count a cleaning time. Meanwhile, the controller or the processor of the intelligent toilet remote controller 10 controls the cleaning timing display to display the cleaning time. When the cleaning lasts for a predetermined amount of time, such as 5 minutes, or the user actively presses a stop button, or after the user starts other functions, the time counting is stopped. Meanwhile, the controller or the processor of the intelligent toilet remote controller 10 controls the cleaning timing display to stop displaying the cleaning time.

According to the present application, the cleaning timing display is added on the intelligent toilet remote controller, which increases functions of time reminding and human-machine sensory interaction and plays a better role in customer care.

Embodiment 2

As shown in FIG. 1 and FIG. 2, an intelligent toilet remote controller 10 according to an embodiment of the present application comprises: a remote controller body and a controller accommodated in the remote controller body and used for communicational connection with the intelligent toilet 20. The remote controller body is provided with a cleaning timing display, and the cleaning timing display is connected communicatively with the controller. In an embodiment, the controller of the intelligent toilet remote controller 10 may comprise a processor configured to perform an operation, function, or the like as described in the present disclosure. The processor may be a general purpose or specific purpose processor, an application specific integrated circuit (ASIC), one or more programmable logic controllers (PLCs), one or more field programmable gate arrays (FPGAs), a group of processing components, or other suitable processing components. The processor is configured to execute computer code or instructions stored in memory or received from other computer readable media (e.g., embedded flash memory, local hard disk storage, local ROM, network storage, a remote server, etc.). The processor may be a single device or combinations of devices, such as associated with a network, distributed processing, or cloud computing.

The remote controller body comprises a housing 1 and a button film 3 attached on an outer surface of the housing 1. An electric control board 4 is arranged in the housing 1, and the controller is fixed on the electric control board 4. The cleaning timing display is a display hardware 2 arranged on one side of the button film 3 facing the housing 1, and the display hardware 2 is communicatively connected with the controller. The part of the button film 3 where the button film 3 contacts the display hardware 2 is a semitransparent film. The display hardware 2 is a digital tube or a display screen. The display hardware 2 is communicatively connected with the controller through a communication line 21, one end of the communication line 21 is communicatively connected with the display hardware 2, and the other end of the communication line 21 is inserted into the housing 1 to be communicatively connected with the controller. The communication line 21 is a flexible flat cable. The electric control board 4 is provided with a timer and a radio frequency module, and the controller is communicatively communicated with the timer, the radio frequency module and the display hardware 2 respectively. The housing 1 is provided with one or more buttons 11, the buttons 11 contact corresponding switches on the electric control board 4, and the switches are communicatively connected with input ends of the controller.

Specifically, the display hardware 2 is added to the button-type remote controller as the cleaning timing display in this embodiment. The display hardware 2 is the digital tube or the display screen. Meanwhile, the controller is communicatively connected with the radio frequency (RF) module. By using the RF module, the remote controller may be in interaction and real-time communication with the host. The controller is mounted on the electric control board 4, and the controller is communicatively connected with the timer, the RF module, and the display hardware 2 through the communication line on the electric control board 4 respectively.

The intelligent toilet remote controller 10 further comprises a rear panel 22 disposed on an outer surface of the housing 1, a key panel 23, a battery 24 disposed in the housing 1, and a battery cap 25 disposed on one end of the battery 24.

A user operates the remote controller through the button 11, and the button 11 contacts or disconnects with the switch on the electric control board 4, so as to input instructions to the controller. After receiving the input instructions of the button 11, the controller sends a cleaning command to the intelligent toilet 20 as shown in FIG. 3 through the radio frequency module. After the intelligent toilet receives the cleaning command, a spraying rod is stretched or extended out to spray water. When water is sprayed out, the intelligent toilet 20 sends a command back to the intelligent toilet remote controller 10, and the controller or the processor of the intelligent toilet remote controller 10 controls the timer to start to count a cleaning time. Meanwhile, the controller or the processor of the intelligent toilet remote controller 10 controls the display hardware 2 to display the cleaning time. When the cleaning lasts for a predetermined amount of time such as 5 minutes, or the user actively presses a stop button, or after the user starts other functions, the time counting is stopped. The intelligent toilet remote controller 10 displays a current cleaning duration on the display hardware 2. If the cleaning continues, the time counting continues.

The display hardware 2 (the digital tube or the display screen) and the electric control board 4 are fixed in the housing 1 of the remote controller. The button film 3 is attached on the front face of the housing 1, and the button film 3 is designed as the semitransparent film at the part of the timing figure, that is, the semitransparent film is used at the part of the button film 3 where the button film 3 contacts the display hardware 2. Therefore, visually when the timing figure is not displayed, the background color of the film is the same color, so that a display position cannot be seen from the front face, and the figure is shown through the display hardware 2 during displaying.

The display hardware 2 is inserted into the housing 1 through a communication line 21 and is communicatively connected with the controller on the electric control board 4. The communication line 21 is the flexible flat cable.

The intelligent toilet remote controller of the present application communicates with the intelligent toilet through the RF module, and when the intelligent toilet is cleaned, the time is counted through the timer, so that the cleaning time of the current user is displayed on the intelligent toilet remote controller, thus increasing functions of time reminding and human-machine sensory interaction, and playing a better role in customer care. Meanwhile, the button film adopts the semitransparent film at the part of the button film where the button film contacts the display hardware, so that an appearance is more uniform.

Embodiment 3

FIG. 3 is a schematic systematic diagram of an intelligent toilet control system according to an embodiment of the present application. As shown in FIG. 3, an intelligent toilet control system according to an embodiment of the present application comprises an intelligent toilet 20 and the intelligent toilet remote controller 10 as described above. The host of the intelligent toilet 20 is communicatively connected with the controller or processor of the intelligent toilet remote controller 10.

The intelligent toilet remote controller 10 comprises a remote controller body and a controller accommodated in the remote controller body and used for communicational connection with an intelligent toilet. The remote controller body is provided with a cleaning timing display, and the cleaning timing display is communicatively connected with the controller.

According to the present application, the cleaning timing display is added on the intelligent toilet remote controller, which increases functions of time reminding and human-machine sensory interaction and plays a better role in customer care.

In this embodiment, the intelligent toilet 20 comprises a bidet 201 including at least one spraying rod configured to be stretched or extended out to spray water. When water is sprayed out, the intelligent toilet 20 sends a command back to the intelligent toilet remote controller 10. The intelligent toilet remote controller 10 controls a timer to start to count a cleaning time. Meanwhile, the controller or the processor of the intelligent toilet remote controller 10 controls the display hardware 2 to display the cleaning time. When the cleaning lasts for a predetermined amount of time such as 5 minutes, or the user actively presses a stop button, or after the user starts other functions, the time counting is stopped. The intelligent toilet remote controller 10 displays a current cleaning duration on the display hardware 2. If the cleaning continues, the time counting continues.

Embodiment 4

Figure 4:
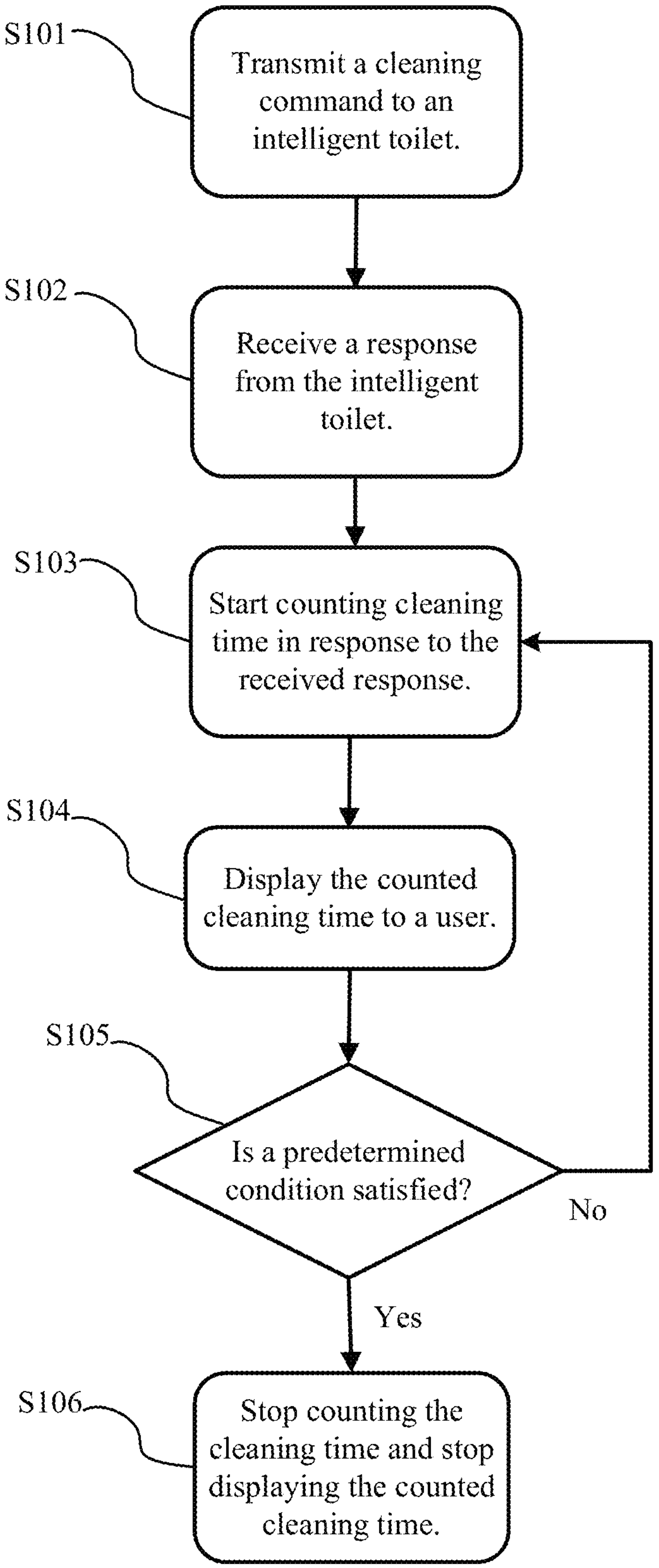
FIG. 4 is a flow chart of a method for counting cleaning time of an intelligent toilet by using the intelligent toilet remote controller according to an embodiment of the present disclosure.

FIG. 4 is a flow chart of a method for counting cleaning time of the intelligent toilet by using the intelligent toilet remote controller according to an embodiment of the present disclosure. In this embodiment, the intelligent toilet and the intelligent toilet remote controller may be the intelligent toilet and the intelligent toilet remote controller as described in Embodiment 1, Embodiment 2, or Embodiment 3.

At act S101, the processor of the intelligent toilet remote controller 10 may transmit a cleaning command to the intelligent toilet 20 or the bidet 201 of the intelligent toilet 20. The cleaning command is configured to control the intelligent toilet 20 or the bidet 201 to start a cleaning. When the intelligent toilet 20 or the bidet 201 receives the cleaning command, the intelligent toilet 20 or the bidet 201 may extend the spraying rod to spray water and transmit a response or a command to the intelligent toilet remote controller 10 to confirm that the cleaning has been started.

At act S102, the processor of the intelligent toilet remote controller 10 may receive the response from the intelligent toilet 20 or the bidet 201. The response indicates that the intelligent toilet 20 or the bidet 201 has started the cleaning.

At act S103, the processor of the intelligent toilet remote controller 10 may start counting cleaning time in response to the received response from the intelligent toilet 20 or the bidet 201. The cleaning time may be counted as soon as the processor of the intelligent toilet remote controller 10 receives the response from the intelligent toilet 20 or the bidet 201.

At act S104, the cleaning timing display of the intelligent toilet remote controller 10 may display the counted cleaning time to the user while counting the cleaning time.

At act S105, the processor of the intelligent toilet remote controller 10 may determine whether a predetermined condition is satisfied. In an embodiment, the processor of the intelligent toilet remote controller 10 may determine whether the counted cleaning time is equal to or longer than a predetermined time (e.g., 5 minutes).

In another embodiment, the processor of the intelligent toilet remote controller 10 may determine whether the user actively stops the cleaning by pressing a stop button of the intelligent toilet remote controller 10. In another embodiment, the processor of the intelligent toilet remote controller 10 may determine whether the user starts another operation of the intelligent toilet 20 or the bidet 201 by pressing a corresponding button of the intelligent toilet remote controller 10.

When the processor of the intelligent toilet remote controller 10 determines that the predetermined condition is satisfied (Yes in S105), the method for counting cleaning time of the intelligent toilet 20 or the bidet 201 proceeds to S106.

At act S106, the processor of the intelligent toilet remote controller 10 may stop counting the cleaning time and displaying the counted cleaning time. The processor of the intelligent toilet remote controller 10 may instruct the intelligent toilet to perform an operation accordingly.

In an embodiment, the intelligent toilet 20 or the bidet 201 may stop the cleaning when the counted cleaning time is equal to or longer than a predetermined amount of time (e.g., 5 minutes).

In another embodiment, the intelligent toilet 20 or the bidet 201 may stop the cleaning when the user presses the stop button of the intelligent toilet remote controller 10. In another embodiment, the intelligent toilet 20 or the bidet 201 may perform the operation when the user presses the corresponding button of the intelligent toilet remote controller 10.

When the processor of the intelligent toilet remote controller 10 determines that the predetermined condition is not satisfied (No in S105), the method for counting cleaning time of the intelligent toilet 20 or the bidet 201 returns to S103 so as to continue to count the cleaning time.

The above embodiments only express some implementations of the present disclosure, and the descriptions thereof are specific and detailed, but cannot be understood as limiting the scope of the present disclosure. It should be pointed out that those of ordinary skill in the art may further make several modifications and improvements without departing from the concept of the present disclosure, and these modifications and improvements all fall within the scope of protection of the present disclosure. Therefore, the scope of protection of the present disclosure should be subject to the appended claims.

I claim:

1. An intelligent toilet remote controller, comprising:
a remote controller body; and
a processor accommodated in the remote controller body and configured to be communicatively connected with an intelligent toilet,
wherein the remote controller body comprises a cleaning timing display,
wherein the cleaning timing display is communicatively connected with the processor,
wherein the remote controller body further comprises:
a housing; and
a button film attached on an outer surface of the housing, and
wherein the cleaning timing display is disposed between the button film and the outer surface of the housing.

2. The intelligent toilet remote controller according to claim 1, wherein a portion of the button film where the button film contacts the cleaning timing display is a semi-transparent film.

3. The intelligent toilet remote controller according to claim 1, wherein the cleaning timing display is a digital tube or a display screen.

4. The intelligent toilet remote controller according to claim 1,
wherein the cleaning timing display is communicatively connected with the processor through a communication line,
wherein a first end of the communication line is communicatively connected with the cleaning timing display, and
wherein a second end of the communication line is inserted into the housing so as to be communicatively connected with the processor.

5. The intelligent toilet remote controller according to claim 4, wherein the communication line is a flexible flat cable.

6. The intelligent toilet remote controller according to claim 1, further comprising an electric control board accommodated in the housing, wherein the processor is fixed on the electric control board.

7. The intelligent toilet remote controller according to claim 6,
wherein the electric control board comprises a timer and a radio frequency module, and
wherein the processor is communicatively connected with the timer, the radio frequency module, and the cleaning timing display respectively.

8. The intelligent toilet remote controller according to claim 7,
wherein the housing comprises one or more buttons,
wherein the one or more buttons contact corresponding switches on the electric control board, and
wherein the switches are communicatively connected with input ends of the processor.

9. An intelligent toilet control system, comprising:
an intelligent toilet; and
an intelligent toilet remote controller, comprising:
a remote controller body; and
a processor accommodated in the remote controller body and configured to be communicatively connected with the intelligent toilet,
wherein the remote controller body comprises a cleaning timing display,
wherein the cleaning timing display is communicatively connected with the processor,
wherein a host of the intelligent toilet is configured to be communicatively connected with the processor of the intelligent toilet remote controller,
wherein the remote controller body comprises:
a housing; and
a button film attached on an outer surface of the housing, and
wherein the cleaning timing display is disposed between the button film and the outer surface of the housing.

10. The intelligent toilet control system according to claim 9, wherein a portion of the button film where the button film contacts the cleaning timing display is a semi-transparent film.

11. The intelligent toilet control system according to claim 9, wherein the cleaning timing display is a digital tube or a display screen.

12. The intelligent toilet control system according to claim 9,
wherein the cleaning timing display is communicatively connected with the processor through a communication line,
wherein a first end of the communication line is communicatively connected with the cleaning timing display, and
wherein a second end of the communication line is inserted into the housing so as to be communicatively connected with the processor.

13. The intelligent toilet control system according to claim 12, wherein the communication line is a flexible flat cable.

14. The intelligent toilet control system according to claim 9, further comprising an electric control board accommodated in the housing,
wherein the processor is fixed on the electric control board.

15. The intelligent toilet control system according to claim 14, wherein the electric control board comprises a timer and a radio frequency module, and wherein the processor is communicatively connected with the timer, the radio frequency module, and the cleaning timing display respectively.

16. The intelligent toilet control system according to claim 15, wherein the housing comprises one or more buttons, wherein the one or more buttons contact corresponding switches on the electric control board, and wherein the switches are communicatively connected with input ends of the processor.

17. The intelligent toilet control system according to claim 15, wherein the processor of the intelligent toilet remote controller is configured to be communicatively connected with the host of the intelligent toilet via the radio frequency module.

18. A method for counting cleaning time of an intelligent toilet by using an intelligent toilet remote controller, the method comprising:

transmitting, by a processor of the intelligent toilet remote controller, a cleaning command to the intelligent toilet, wherein the cleaning command is configured to control the intelligent toilet to start a cleaning;

receiving, by the processor of the intelligent toilet remote controller, a response from the intelligent toilet, wherein the response indicates that the intelligent toilet has started the cleaning;

starting, by the processor of the intelligent toilet remote controller, counting cleaning time in response to the received response from the intelligent toilet;

displaying, by a cleaning timing display of the intelligent toilet remote controller, the counted cleaning time while counting the cleaning time;

determining whether at least one predetermined condition is satisfied;

stopping, by the processor of the intelligent toilet remote controller, counting the cleaning time; and stopping, by the processor of the intelligent toilet remote controller, displaying the counted cleaning time in response to a determination that the at least one predetermined condition is satisfied.

* * * * *